3,654,307
O,O-DIALKYL S-[2-HALO - 1 - (N-SUCCINIMIDO) ETHYL] PHOSPHOROTHIOATES AND PHOSPHORODITHIOATES AND INSECTICIDAL COMPOSITIONS CONTAINING THEM
Joel D. Jamison, 705 Abbey Road, Wilmington, Del. 19808
No Drawing, Continuation-in-part of application Ser. No. 603,747, Dec. 22, 1966. This application June 19, 1969, Ser. No. 835,909
Int. Cl. C07d 27/10
U.S. Cl. 260—326.5 A
16 Claims

ABSTRACT OF THE DISCLOSURE

Disclosed are O,O-dialkyl S-[2-halo-1-(N-succinimido)ethyl]phosphorothioates and phosphorodithioates of the structural formula:

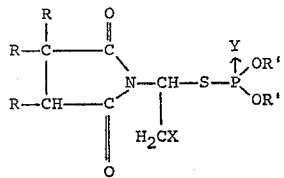

wherein each R is selected from the group consisting of the hydrogen and R' radicals with the maximum number of R radicals that can be R' radicals being two, X is a halo radical, Y is selected from the group consisting of the oxo and thioxo radicals, and each R' is a $C_1$–$C_7$ alkyl radical. These compounds are useful as insecticides.

---

The application is a continuation-in-part of copending application Ser. No. 603,747, filed Dec. 22, 1966, and now abandoned.

This invention is in the chemical arts. It relates to that branch of organic chemistry having to do with phosphate esters and particularly phosphorothioates and phosphorodithioates.

In summary, this invention in one aspect comprises O,O-dialkyl S-[2-halo-1-(N-succinimido)ethyl] phosphorothioates and phosphorodithioates having the structural Formula I:

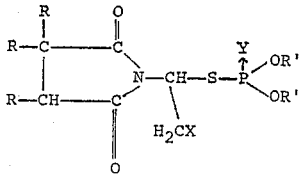

wherein each R is selected from the group consisting of the hydrogen and R' radicals with the maximum number of R radicals that can be R' radicals being two, X is a halo radical, Y is selected from the group consisting of the oxo and thioxo radicals, and each R' is a $C_1$–$C_7$ alkyl radical. Examples of the halo radical are the fluoro, chloro, bromo and iodo radicals. A $C_1$–$C_7$ alkyl radical encompasses both straight chain and branched chain radicals having 1–7 carbon atoms. Exemplary of such alkyl radicals are the methyl, ethyl, propyl, isopropyl, butyl, isobutyl, t-butyl, pentyl, hexyl, heptyl, and the like alkyl radicals. Examples of the compounds of this invention include:

O,O-dimethyl S-[2-chloro-1-(N-succinimido)ethyl] phosphorodithioate

O,O-dimethyl S-[2-bromo-1-(N-succinimido)ethyl] phosphorodithioate

O,O-dimethyl S-[2-fluoro-1-(N-succinimido)ethyl] phosphorodithioate

O,O-dimethyl S-[2-iodo-1-(N-succinimido)ethyl] phosphorodithioate

O,O-diethyl S-[2-chloro-1-(N-succinimido)ethyl] phosphorodithioate

O,O-dimethyl S-[2-bromo-1-(2'-methylsuccinimido) ethyl] phosphorodithioate

O,O-diethyl S-[2-chloro-1-(2'-methylsuccinimido) ethyl] phosphorodithioate

O,O-diethyl S-[2-bromo-1-(2'-methylsuccinimido) ethyl] phosphorodithioate

O,O-diethyl S-[2-chloro-1-(2',2'-dimethylsuccinimido) ethyl] phosphorodithioate

O,O-diethyl S-[2-chloro-1-(2'-methyl-2'-heptylsuccinimido)ethyl] phosphorodithioate O,O-diethyl S-[2-chloro-1-(2',3'-dimethylsuccinimido) ethyl] phosphorodithioate O,O-diethyl S-[2-chloro-1-(2',3'-diheptylsuccinimido) ethyl] phosphorodithioate O,O-dimethyl S-[2-chloro-1-(2',3'-di(t-butyl)-succinimido)ethyl] phosphorodithioate O-methyl-O-heptyl S-[2-chloro-1-(N-succinimido) ethyl] phosphorodithioate O,O-diheptyl S-[2-chloro-1-(N-succinimido)ethyl] phosphorodithioate O,O-diisopropyl S-[2-chloro-1-(N-succinimido)ethyl] phosphorodithioate O,O-di(t-butyl) S-[2-chloro-1-(N-succinimido)ethyl] phosphorodithioate O,O-dimethyl S-[2-chloro-1-(N-succinimido)ethyl] phosphorothioate O,O-dimethyl S-[2-bromo-1-(N-succinimido)ethyl] phosphorothioate O,O-dimethyl S-[2-fluoro-1-(N-succinimido)ethyl] phosphorothioate O,O-dimethyl S-[2-iodo-1-(N-succinimido)ethyl] phosphorothioate O,O-diethyl S-[2-iodo-1-(N-succinimido)ethyl] phosphorothioate O,O-diethyl S-[2-chloro-1-(N-succinimido)ethyl] phosphorothioate O,O-dimethyl S-[2-bromo-1-(2'-methylsuccinimido) ethyl] phosphorothioate O,O-diethyl S-[2-chloro-1-(2'-methylsuccinimido) ethyl] phosphorothioate O,O-diethyl S-[2-bromo-1-(2'-methylsuccinimido) ethyl] phosphorothioate O,O-diethyl S-[2-chloro-1-(2',2'-dimethylsuccinimido) ethyl] phosphorothioate O,O-diethyl S-[2-chloro-1-(2'-methyl-2'-heptyl-succinimido)ethyl] phosphorothioate O,O-diethyl S-[2-chloro-1-(2',3'-dimethyl-succinimido)ethyl] phosphorothioate O,O-diethyl S-[2-chloro-1-(2',3'-diheptylsuccinimido) ethyl] phosphorothioate O,O-dimethyl S-[2-chloro-1-(2',2'-di(t-butyl)succinimido) ethyl] phosphorothioate O-methyl-O-heptyl S-[2-chloro-1-(N-succinimido) ethyl] phosphorothioate O,O-diheptyl S-[2-chloro-1-(N-succinimido)ethyl] phosphorothioate O,O-diisopropyl S-[2-chloro-1-(N-succinimido)ethyl] phosphorothioate O,O-di(t-butyl) S-[2-chloro-1-(N-succinimido)ethyl] phosphorothioate and the like.

The compounds of this invention range from a normally oily state to a normally solid state. In general, they are insoluble in water, highly soluble in solvents such as acetone and the like, and soluble to a practical extent in solvents such as benzene and the like. The compounds of this invention in general are toxic to various insects and particularly to Mexican bean beetle larvae. Hence, the compounds of this invention are useful as insecticides.

Each of the compounds of this invention is made by reacting the corresponding N-vinyl succinimide, a compound of the Formula II:

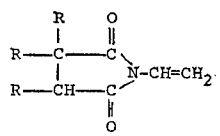

wherein the R radicals correspond to the R radicals of Formula I, with halogen or mixture of halogens to obtain the corresponding N-(1,2-dihaloethyl)succinimide which is reacted with either a salt of a dialkylthiophosphoric acid or a salt of a dialkyldithiophosphoric acid, depending on whether the compound of this invention is a thioate or dithioate.

In the reaction of N-(1,2-dihaloethyl)succinimide with a salt of either a dialkylthiophosphoric acid or a dialkyldithiophosphoric acid, the ammonium salt is preferred. However, other salts such as alkali metal salts, alkaline earth metal salts or tertiary amine salts can be used.

The reaction temperature is generally 0–100° C. with a temperature of 25–70° C. being preferred. Prolonged exposure of the compounds of this invention to temperatures above 20–25° C. after completion of the reaction should be avoided so as to avoid thermal decomposition of the end product. The reaction is preferably carried out in a normally liquid reaction medium. Suitable liquids for this purpose include water, methanol, ethanol, acetone, methyl ethyl ketone, benzene, toluene, acetonitrile and similar neutral volatile organic solvents. Mixtures of these solvents, including aqueous mixtures, can be used.

For insecticidal uses, the compounds of this invention are preferably incorporated at effective concentrations into insecticidal compositions which comprise another aspect of this invention.

The insecticidal compositions of this invention comprise insecticidal material and dispersible carrier material. In some embodiments the insecticidal material comprises only one compound of this invention. In other specific embodiments the insecticidal material comprises two or more compounds of this invention. In still other embodiments of this invention the insecticidal material comprises not only one or more compounds of this invention, but other insecticidal compounds.

In those embodiments of the insecticidal compositions of this invention, which are normally solid, the dispersible carrier material is generally an inert solid in a divided condition.

Some embodiments of the solid compositions are granular, while others are dispersible powders or dusts.

The granular compositions are of the coated type, the impregnated type or the incorporated type.

The coated type granular composition is made by dusting a wettable powder or ground powder comprising the insecticidal material onto granular carrier material which either before or after the dusting has been admixed with a sticker. Water, oils, alcohols, glycols, aqueous gums, waxes and the like, including mixtures thereof, are used as stickers. Examples of granular carrier material include attaclay, corn cobs, vermiculite, walnut hulls and almost any granular mineral or organic material screened to the desired particle size fraction. Generally the insecticidal material is about 2–20% by weight of the granular composition, the sticker is generally about 5–40% by weight of the composition, and the granular carrier material is generally about 60–93% by weight of the composition.

In the case of the impregnated type granular composition, the insecticidal material is dissolved in a solvent or, if solid, melted, and then sprayed on or poured into the granular carrier material. The solvent can be removed by evaporation, or permitted to remain. In either case, the insecticidal material impregnates the particles of the granular carrier material. Examples of the granular carrier material include those just mentioned with respect to the coated type of granular composition. The insecticidal material is generally about 2–20% by weight of the composition, while the granular carrier material is generally about 80–98% by weight of the composition.

Relative to the incorporated type granular composition, the insecticidal material is mixed with an inert finely divided solid such as, for example, clay, carbon, plaster of Paris and the like, and made into a mud with water or other inert evaporable liquid. The mud is then dried to a solid sheet or cake, broken up or comminuted, and screened to the desired particle size fraction. In other embodiments, the mud is put into a granular pan and granules are formed therein with subsequent removal of the water or solvent. In still another procedure, the mud is extruded through a die into rods which are cut into small pieces. In the incorporated type granular composition, the insecticidal material generally is about 2–50% by weight of the composition, and the solid carrier material is about 50–98% by weight of the composition.

In all granular embodiments of the herbicidal compositions of this invention, various additives in minor concentrations relative to the carrier material also can be present.

In the other embodiments of the solid insecticidal compositions of this invention, the carrier is usually a dispersible inert solid. A typical dispersible solid of this type is clay. Other suitable solids (dispersible solid) include talc, attapulgite, pyropylite, diatomaceous earth, kaolin, aluminum magnesium silicate, montmorillonite, fuller's earth, sawdust and the like. The solid dispersible compositions can be air dispersible, in which case they can be applied as dusts. They can be water dispersible and in such case they are usually referred to as wettable powders. Generally when it is intended that the composition be water dispersible, the composition preferably contains emulsifying material (one or more surfactants) at a concentration sufficient to enable a suspension of the desired degree of stability to be formed when the composition is admixed with a suitable quantity of water. A typical dispersible solid composition of this invention generally comprises about 10–50% by weight of insecticidal material, about 50–90% by weight of solid carrier material and, when emulsifying material is present, about 1–10% by weight of emulsifying material.

Other specific embodiments of the herbicidal composition of this invention comprises solutions of insecticidal material in inert, preferably volatile, usually water immiscible, solvents for the insecticidal material. Examples of suitable solvents include isophorone, cyclohexanone, methyl isobutyl ketone, xylene, and the like. Such a solution, which can be regarded as a concentrate, typically comprises about 10–50% by weight of insecticidal material and about 50–90% by weight of solvent. The solution can be applied as is, or diluted with more solvent, or dispersed in water, or water dispersed in it. Preferably, when it is intended that the solution be dispersed in water or water dispersed in it, the mixture of solution and water also comprises emulsifying material at a concentration sufficient to enable a dispersion of the desired degree of stability to be formed. A typical emulsifying material concentration is about 1–10% by weight of the concentrate. The water concentration is such that the insecticidal material concentration is about 0.5–10% by weight of the total composition.

Examples of the surfactants employed in both the liquid and solid compositions of this invention comprise the well-known surface active agents of the anionic, cationic or non-ionic types and include alkali metal (sodium or potassium) oleates and similar soaps, amine salts of long chain fatty acids (oleates), sulfonated animal and vegetable oils (fish oils and castor oil), sulfonated acyclic hydrocarbons, sodium salts of lignin sulfonic acids, alkyl-naphthalene sodium sulfonates, sodium lauryl sulfonate, disodium monolaurylphosphates, sorbitol laurate, pentaerythritol monostearate, glyceryl monostearate, polyethylene oxides, ethylene oxide condensates of stearic acid, stearyl alcohol, stearyl amine, rosin amines, dehydroabietyl amine and the like, lauryl amine salts, dehydroabietylamine salts, lauryl pyridinium bromide, stearyl trimethylammonium bromide, and cetyl dimethylbenzylammonium chloride.

The insecticidal compositions of this invention are used by applying them by conventional ways and means to the habitat of the inect or insects to be killed. Generally, the compositions are applied at rates of 0.1–10 pounds of insecticidal material per acre, depending on the insecticide effect desired. Higher and lower effective rates, however, are within the broader concepts of this invention.

The best mode now contemplated of carrying out this invention is illustrated by the following working examples of various aspects of this invention, including specific embodiments. This invention is not limited to these specific embodiments. In these examples all percentages are by weight unless otherwise indicated, all parts by weight are indicated by w., all parts by volume are indicated by v., and each part by weight (w.) bears the same relationship to each part by volume (v.) as the kilogram does to the liter.

EXAMPLE 1

This example illustrates the synthesis of N-(1,2-dichloroethyl)succinimide which is a starting compound in one process for making a number of the compounds of this invention.

Chlorine gas (150 w.) is added to a solution of N-vinylsuccinimide (250 w.) in carbon tetrachloride (500 v.) at 0° C. All of the carbon tetrachloride is removed by vacuum and the residue is collected and recrystallized twice from isopropanol. The product thus obtained consists essentially of N-(1,2-dichloroethyl)succinimide. A typical yield of the product is 302.6 w. It typically melts at 72–73° C. and analyzes: Cl=35.9% (calculated: Cl=36.2%).

EXAMPLE 2

This example illustrates how to make N-(1,2-dibromoethyl)succinimide which is used in a process for making a number of the compounds of this invention.

Bromine (80 w.) is added to a solution of N-vinylsuccinimide (62.5 w.) in methylene chloride (500 v.). All of the methylene chloride is removed by vacuum and the resulting residue is poured into water. The solid that results is collected and recrystallized from a 1:1 volumetric ratio mixture of diethyl ether and isopropanol. The product thus obtained consists essentially of N-(1,2-dibromoethyl)succinimide. A typical yield of the product is 63.3 w. It typically melts at 52–53° C. and analyzes: Br=54.4% (calculated: Br=56.2%).

EXAMPLE 3

This example illustrates how to make N-(1',2'-dichloroethyl)-2-methylsuccinimide which is used in a process for making a number of the compounds of this invention.

To 2-methylsuccinic anhydride (515 w.) in xylene (1000 v.) is added ethanol amine (275 w.). The solution thus formed is refluxed and water of reaction is removed. The reaction mixture is cooled to 20–25° C., and acetic anhydride (460 w.) is added. The resulting mixture is established and maintained for 4 hours at 100° C., and then distilled to give a first intermediate product (639 w.) consisting essentially of N-(2'-acetoxyethyl)-2-methylsuccinimide. This intermediate product has a typical boiling point of 130–140° C. at a pressure of 0.2–0.7 millimeter of mercury.

Intermediate product (600 w.) is added to a tube packed with stainless steel helices, and heated to 610° C. The pyrolysate thus obtained is distilled to give a second intermediate product (250 w.) consisting essentially of N-vinyl-2-methylsuccinimide.

Chlorine gas (16 w.) is added to the second intermediate product (27.8 w.) in carbon tetrachloride (100 v.) at 0° C. All of the carbon tetrachloride is removed by vacuum, and the residue is mixed with water and extracted with methylene chloride. The methylene chloride extract is dried and the methylene chloride removed. The resulting end product (40.9 w.) consists essentially of N-(1',2'-dichloroethyl)-2-methylsuccinimide. This end product is referred to hereinafter as Example 3 product.

EXAMPLE 4

This example illustrates how to make N-(1',2'-dibromoethyl)-2-methylsuccinimide, a starting compound for the synthesis of a number of compounds of this invention.

Bromine (32.0 w.) is added to Example 3 second intermediate product (27.8 w.) in methylene chloride (100 v.) at 0° C. The methylene chloride is removed by evaporation to give the desired end product (56.8 w.) which consists essentially of N-(1',2'-dibromoethyl)-2-methylsuccinimide.

EXAMPLE 5

This example illustrates O,O-dimethyl S-[2-chloro-1-(N-succinimido)ethyl]phosphorodithioate and a process for making it.

A mixture of ammonium dimethyldithiophosphate (52 w.), Example 1 product (49 w.) and water (250 v.) is stirred at 50° C. for 24 hours. The resulting reaction mixture is extracted twice with benzene (100 v. each time). The extracts are combined, washed first with 5% aqueous sodium bicarbonate and then with water, and dried. The benzene is removed by distillation, leaving a residue (58.3 w.) which at 20–25° C. is a solid. This crude product is recrystallized twice from diethyl ether to give the desired end product (32.8 w.) which consists essentially of O,O-dimethyl S-[2-chloro-1-(N-succinimido)ethyl] phosphorodithioate. The product typically melts at 66–67° C. It typically analyzes: 10.3% P and 11.2% Cl (calculated for $C_8H_{13}ClNO_4PS_2$: 9.8% P and 11.2% Cl).

EXAMPLE 6

This example illustrates O,O-diethyl S-[2-chloro-1-(N-succinimido)ethyl] phosphorodithioate and a process for making it.

Following the procedure of Example 5, ammonium diethyldithiophosphate (24.4 w.) and Example 1 product (19.6 w.) are reacted in water (100 v.) and the desired end product isolated. This product consists essentially of O,O-diethyl S-[2-chloro - 1 - (N-succinimido)ethyl] phosphorodithioate. The product is typicaly a yellow oil (28.7 w.). A typical elemental analysis is 8.6% P and 9.9% Cl (calculated for $C_{10}H_{17}ClNO_4PS_2$: 9.0% P and 10.3% Cl).

EXAMPLE 7

This example illustrates O,O-dimethyl S-[2-bromo-1-(N-succinimido)ethyl] phosphorodithioate and how to make it.

Following the procedure of Example 5, ammonium dimethyldithiophosphate (40 w.) Example 2 product (56.0 w.) are reacted and the desired end product consisting essentially of O,O-dimethyl S-[2-bromo-1-(N-succinimido)ethyl] phosphorodithioate obtained. This product is typically a solid (41.9 w.) melting at 63–64° C. and analyzing 9.0% P and 21.0% Br. (calculated for $C_8H_{13}BrNO_4PS_2$: 8.6% P and 22.1% Br).

EXAMPLE 8

This example illustrates O,O-diethyl S-[2-bromo-1-(N-succinimido)ethyl] phosphorodithioate and its synthesis.

Following the procedure of Example 5, ammonium diethyldithiophosphate (48.8 w.) and Example 2 product (57.0 w.) are reacted in water (250 v.), and the desired end product consisting essentially of O,O-diethyl S-[2-bromo-1-(N-succinimido)ethyl] phosphorodithioate is obtained. This product typically is an amber colored, viscous oil (65.9 w.) which analyzes: 8.6% P and 18.0% Br (calculated for $C_{10}H_{17}BrNO_4PS_2$: 8.0% P and 20.5% Br).

EXAMPLE 9

This example relates to O,O-diisopropyl S-[2-chloro-1-(N-succinimido)ethyl] phosphorodithioate and its synthesis.

Following the procedure of Example 5, ammonium diisopropyldithiophosphate (17.9 w.) and Example 1 product (13.7 w.) are reacted in water (100 v.), and the desired end product, consisting essentially of O,O-diisopropyl S-[2-chloro-1-(N-succinimido)ethyl]phosphorodithioate, is obtained. This product typically is an amber colored oil (20.8 w.) and analyzes: 8.8% P and 8.7% Cl (calculated for $C_{12}H_{21}ClNO_4PS_2$: 8.3% P and 9.5% Cl).

EXAMPLE 10

This example pertains to O,O-diisopropyl S-[2-bromo-1-(N-succinimido)ethyl] phosphorodithioate and how to make it.

Following the procedure of Example 5, ammonium diisopropyldithiophosphate (15.3 w.) and Example 2 product (17.1 w.) are reacted in water (100 v.), and the desired end product isolated. This product consists essentially of O,O-diisopropyl S-[2-bromo-1-(N-succinimido)ethyl] phosphorodithioate. The product typically is an amber colored oil (21.5 w.) and analyzes 8.4% P and 15.1% Br (calculated for $C_{12}H_{21}BrNO_4PS_2$: 7.4% P and 19.1% Br).

EXAMPLE 11

O,O-dimethyl S-[2-chloro-1-(2'-methylsuccinimido)ethyl] phosphorodithioate is the compound made according to the process of this example.

A mixture of ammonium dimethylphosphorodithioate (15.8 w.), Example 3 product (15.7 w.) and water (100 v.) is stirred at 50° C. for 4 hours. Benzene (50 v.) is added to the reaction mixture, and the mixture is stirred an additional 4 hours at 50° C. The resulting benzene phase is separated from the aqueous phase. The aqueous phase is mixed with stirring with fresh benzene (50 v.) and the benzene phase removed from the aqueous phase. The removed benzene phases are combined, washed with 5% aqueous sodium bicarbonate and again with water, and dried. The benzene is removed by distillation. The product that remains consists essentially of O,O-dimethyl S-[2-chloro-1-(2'-methylsuccinimido)ethyl] phosphorodithioate. The product typically is a dark oil and analyzes: 10.1% P (calculated for $C_9H_{15}ClNO_4PS_2$: 9.4% P).

EXAMPLE 12

This example illustrates O,O-diethyl S-[2-chloro-1-(2'-methyl-N-succinimido)ethyl] phosphorodithioate and a process for making this compound.

Following the procedure of Example 11, ammonium diethylphosphorodithioate (18.3 w.) and Example 3 product (15.7 w.) are reacted in water (100 v.), and the desired end product is isolated. This product consists essentially of O,O-diethyl S-[2-chloro-1-(2'-methyl-N-succinimido)ethyl] phosphorodithioate. The product typically is a dark oil (18.3 w.) and analyzes: 9.6% P (calculated for $C_{11}H_{19}ClNO_4PS_2$: 8.68% P).

EXAMPLE 13

This example illustrates O,O-dimethyl S-[2-bromo-1-(2'-methylsuccinimido)ethyl] phosphorodithioate and its synthesis.

Following the procedure of Example 11, ammonium dimethylphosphorodithioate (10.5 w.) and Example 4 product (15.0 w.) are reacted in water (100 v.), and the desired end product is isolated. This product consists essentially of O,O-dimethyl S-[2-bromo-1-(2'-methylsuccinimido)ethyl] phosphorodithioate. The product typically is an orange oil (14.2 w.) and analyzes: 9.2% P (calculated for $C_9H_{15}BrNO_4PS_2$: 8.2% P).

EXAMPLE 14

This example illustrates the synthesis of O,O-diethyl S - [2 - bromo - 1 - (2 - methylsuccinimido)ethyl] phosphorodithioate.

Following the procedure of Example 11, ammonium diethylphosphorodithioate (12.2 w.) and Example 4 product (15.0 w.) are reacted in water (100 v.), and the desired end product is isolated. The product consists essentially of O,O-diethyl S-[2-bromo-1-(2'-methylsuccinimido)ethyl] phosphorodithioate. The product is typically a yellow oil (17.1 w.) and analyzes: 8.5% P (calculated for $C_{11}H_{19}BrNO_4PS_2$: 7.7% P).

EXAMPLE 15

This example illustrates O,O-dimethyl S-[2-chloro-1-(N-succinimido)ethyl] phosphorothioate, and a process for making it.

Following the procedure of Example 5, ammonium dimethylphosphorothioate (19.1 w.) and Example 1 product (19.6 w.) are reacted in water (100 v.), and the desired end product is isolated. The product consists essentially of O,O-dimethyl S-[2-chloro-1-(N-succinimido)ethyl] phosphorothioate. The product typically is a yellow oil which analyzes: 8.1% P and 10.6% S.

EXAMPLE 16

This example illustrates O,O-diethyl S-[2-chloro-1- (N-succinimido)ethyl] phosphorothioate and how to make it.

Following the procedure of Example 5, ammonium diethyl phosphorothioate (22.0 w.) and Example 1 product (19.6 w.) are reacted in water (100 v.) and the desired end product is isolated. The product consists essentially of O,O-diethyl S-[2-chloro-1-(N-succinimido)ethyl] phosphorothioate. The product typically is a yellow oil which analyzes: 7.6% P and 8.0% S.

EXAMPLE 17

This example illustrates a specific embodiment of an insecticidal composition of this invention.

The general formulation employed in this specific embodiment is:

| Components: | Concentration |
|---|---|
| Toxicant material | 1 w. |
| Tween 20 | 1 v. |
| Benzene | 1 v. |

Tween 20 in the foregoing formulation is a commercial surfactant consisting essentially of polyoxyethylene (20) sorbitan monolaurate, a polyoxyethylene adduct of sorbitan monolaurate wherein the oxyethylene content is about 20 mol percent.

In this example the toxicant material is the product of Example 5.

The composition of this formulation is made by dissolving the toxicant material in the benzene and then adding the Tween 20. The result is a concentrate.

To use the concentrate, it is admixed with water in sufficient quantity to give the desired toxicant concentration. The resulting aqueous emulsion is used by spraying it at an effective rate over the habitat of the insect to be controlled.

The foregoing formulation and procedure for making it are applicable to each one of the products of Examples 6–16.

The insecticidal activities of the compounds of this invention are illustrated by the data in the following table, which data were obtained in standard tests with emulsions made from concentrates formulated as in Example 17. The data are expressed as "percent kill/percent," which means percent of kill at the indicated percent concentration of toxicant material in the aqueous emulsion, "percent kill/p.p.m." which means percent of kill at the indicated parts of toxicant material per million parts of aqueous emulsion, and "percent kill/mg. per ft.$^2$" which means percent of kill at the indicated milligrams of toxicant material per square foot of area sprayed by aqueous emulsion.

centration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by Letters Patent is:

1. A compound having the formula:

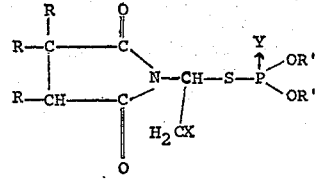

TABLE

| | Percent kill/percent | | | | | | Percent kill/p.p.m. | | | | Adult mosquito, percent kill/ mg./ft.$^2$ | Corn root worm, percent kill/ percent |
|---|---|---|---|---|---|---|---|---|---|---|---|---|
| Toxicant material | House fly | Mexican bean beetle | Pea aphid | Southern army worm | Two-spotted mite (Resistant) | Plum curculio | Pea aphid systemic | Two-spotted mite systemic | Southern army worm systemic | Mosquito larvae | | |
| Product of Example: | | | | | | | | | | | | |
| 5 | 32/0.025 | 100/0.005 10/0.0025 | 100/0.005 50/0.0025 | 100/0.025 25/0.01 | 30/0.05 20/0.01 | 100/0.05 75/0.025 | 100/50 100/10 | 50/10 | 0/50 | 100/0.01 100/0.005 | 100/100 | 100/0.05 90/0.01 60/0.005 |
| 6 | 80/0.025 | 100/0.0025 25/0.001 | 100/0.0025 30/0.001 | 70/0.05 40/0.025 | 100/0.01 80/0.005 | 100/0.05 20/0.025 | 100/50 100/10 | 90/10 | 0/50 | 100/0.01 30/0.005 | 100/100 | 100/0.01 80/0.005 40/0.0025 |
| 7 | 34/0.05 6/0.025 | 90/0.01 50/0.0025 | 100/0.01 0/0.005 | 25/0.05 15/0.025 | 35/0.005 10/0.001 | 90/0.05 10/0.01 | 100/50 100/10 | 10/10 | 0/50 | 100/0.1 | 0/100 | |
| 8 | 28/0.05 4/0.025 | 100/0.005 60/0.0025 | 100/0.0025 50/0.001 | 35/0.05 0/0.025 | 50/0.025 10/0.005 | 80/0.05 10/0.025 | 70/50 70/10 | 100/50 40/10 | 0/50 | 100/0.01 0/0.001 | 0/100 | 100/0.01 80/0.005 60/0.0025 |
| 9 | 0/0.05 | 100/0.1 0/0.05 | 100/0.05 60/0.005 | 0/0.1 | 100/0.1 80/0.01 40/0.005 | 0/0.1 | 0/50 | 0/50 | 0/50 | 0/0.1 | 0/100 | |
| 10 | 0/0.05 | 100/0.1 0/0.01 | 100/0.05 0/0.005 | 0/0.1 | 100/0.1 60/0.01 20/0.005 | 100/0.1 0/0.025 | 0/50 | 0/50 | 0/50 | 0/0.1 | 0/100 | |
| 11 | 32/0.05 | 100/0.1 100/0.01 20/0.005 | 100/0.05 50/0.005 | 70/0.1 60/0.05 20/0.025 | 100/0.1 40/0.005 | 0/0.1 | 100/10 | | | 100/0.1 | | 67/0.05 0/0.01 |
| 12 | 36/0.05 | 100/0.1 100/0.01 100/0.005 | 100/0.05 100/0.005 | 80/0.1 40/0.05 | 100/0.1 90/0.01 40/0.005 | 0/0.1 | | | | | | 100/0.05 20/0.01 |
| 13 | 0/0.05 | 30/0.1 0/0.05 | 0/0.05 | 0/0.1 | 100/0.1 | 0/0.1 | | | | | | 100/0.05 |
| 14 | 36/0.05 | 100/0.1 100/0.01 100/0.005 | 100/0.05 100/0.005 | 90/0.1 80/0.05 20/0.025 | 0/0.1 | 0/0.1 | | | | 100/0.1 | | 67/0.05 0/0.01 |

From these data it can be seen that the compounds of this invention have insecticidal activity. In general they have contact activity. Some of the compounds have systemic activity. The data show some selectivity in that not all of the compounds tested appear to be effective at the concentrations involved against all of the insects on which tests were made. On the other hand, as a group the compounds of this invention are particularly toxic at practical concentrations to the Mexican bean beetle larvae.

Thus, this invention provides new and useful compounds and new and useful insecticidal compositions containing them.

Other features, advantages, and specific embodiments of this invention will become readily apparent to those exercising ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

The term "consisting essentially of" as used in this specification excludes any unrecited substance at a concentration wherein each R is selected from the group consisting of the hydrogen and R' radicals with the maximum number of R radicals that can be R' radicals being two, X is a halo radical, Y is selected from the group consisting of the oxo and thioxo radicals, and each R' is a $C_1$–$C_7$ alkyl radical.

2. A compound according to claim 1, wherein Y is the thioxo radical.

3. A compound according to claim 2, wherein each R is the hydrogen radical.

4. A compound according to claim 3, wherein X is the chloro radical and each R' is the methyl radical.

5. A compound according to claim 3, wherein X is the chloro radical and each R' is the ethyl radical.

6. A compound according to claim 3, wherein X is the bromo radical and each R' is the methyl radical.

7. A compound according to claim 3, wherein X is the bromo radical and each R' is the ethyl radical.

8. A compound according to claim 2, wherein one R is the methyl radical and each remaining R is the hydrogen radical.

9. A compound according to claim 8, wherein X is the chloro radical and each R' is the methyl radical.

10. A compound according to claim 8, wherein X is the chloro radical and each R' is the ethyl radical.

11. A compound according to claim 8, wherein X is the bromo radical and each R' is the methyl radical.

12. A compound according to claim 8, wherein X is the bromo radical and each R' is the ethyl radical.

13. A compound according to claim 1, wherein Y is the oxo radical.

14. A compound according to claim 13, wherein each R is the hydrogen radical.

15. A compound according to claim 14, wherein X is the chloro radical and each R' is the methyl radical.

16. A compound according to claim 14, wherein is the bromo radical and each R' is the methyl radical.

References Cited

UNITED STATES PATENTS

| | | | |
|---|---|---|---|
| 2,767,194 | 10/1956 | Fancher | 260—326 |
| 2,914,530 | 11/1959 | Schrader et al. | 260—248 |
| 2,995,568 | 8/1961 | Malz et al. | 260—326.5 |
| 3,355,353 | 11/1967 | Jamison | 260—326 X |

ALEX MAZEL, Primary Examiner

J. A. NARCAVAGE, Assistant Examiner

U.S. Cl. X.R.

424—200

Disclaimer 3,654,307.—*Joel D. Jamison*, Wilmington, Del. O,O-DIALKYL S-[2-HALO-1 - (N - SUCCINIMIDO) ETHYL] PHOSPHOROTHIOATES AND PHOSPHORODITHIOATES AND INSECTICIDAL COMPOSITIONS CONTAINING THEM. Patent dated Apr. 4, 1972. Disclaimer filed Aug. 11, 1971, by the assignee, *Hercules Incorporated*.

Hereby disclaims the portion of the term of the patent subsequent to Nov. 28, 1984.

[*Official Gazette May 29, 1973.*]